US012801503B2

(12) United States Patent
Milk et al.

(10) Patent No.: US 12,801,503 B2
(45) **Date of Patent: *Nov. 17, 2026**

(54) COLLABORATIVE MULTILEVEL ERASURE CODING FOR MAXIMIZING DURABILITY AND PERFORMANCE OF STORAGE SYSTEMS

(71) Applicant: VDURA, Inc., San Jose, CA (US)

(72) Inventors: Scott Milk, Mars, PA (US); Christopher Girard, Sanford, FL (US); Shafeeq Sinnamohideen, Pittsburgh, PA (US); Michael Barrell, Longmont, CA (US)

(73) Assignee: VDURA, Inc., San Jose, CA (US)

( * ) Notice: Subject to any disclaimer, the term of this patent is extended or adjusted under 35 U.S.C. 154(b) by 27 days.

This patent is subject to a terminal disclaimer.

(21) Appl. No.: 18/991,012

(22) Filed: Dec. 20, 2024

(65) Prior Publication Data

US 2026/0093585 A1 Apr. 2, 2026

Related U.S. Application Data

(63) Continuation of application No. 18/902,183, filed on Sep. 30, 2024, now Pat. No. 12,210,432.

(51) Int. Cl.
*G06F 11/10* (2006.01)
*G06F 11/20* (2006.01)
*G06F 16/11* (2019.01)

(52) U.S. Cl.
CPC ...... *G06F 11/2094* (2013.01); *G06F 11/1084* (2013.01); *G06F 16/119* (2019.01); *G06F 11/1088* (2013.01)

(58) Field of Classification Search
CPC ............. G06F 11/1084; G06F 11/1088; G06F 11/1092; G06F 11/2094
USPC ........................................................ 714/6.24
See application file for complete search history.

(56) References Cited

U.S. PATENT DOCUMENTS 10,095,585 B1 * 10/2018 Proulx ................ G06F 11/1088
2015/0186411 A1 * 7/2015 Iliadis ................ H04L 67/1097 707/637
2017/0351575 A1 * 12/2017 Baker ................... G06F 3/0667
2021/0255925 A1 * 8/2021 Bent .................. G06F 11/1471
(Continued)

OTHER PUBLICATIONS

United States Office Action, U.S. Appl. No. 18/902,183, Dec. 19, 2024, 10 pages.

*Primary Examiner* — Chae M Ko
(74) *Attorney, Agent, or Firm* — Fenwick & West LLP

(57) ABSTRACT

A file system stores data in a hierarchical storage system comprising a plurality of levels of storage units. If an indication of failure of a storage unit at a lower level is received, the storage system indicates a storage unit at the higher level as failed. The storage system initiates reconstruction of data at the storage unit at the higher level based on redundant data stored other storage units at the higher level. If the number of failed storage units at the higher level exceeds a threshold value, the storage system indicates that the storage unit at the higher level is available. The storage system initiates reconstruction of data at the storage unit at the lower level using redundant data stored in other storage units at the lower level. The storage system may perform data reconstruction at the higher level and lower level concurrently.

20 Claims, 9 Drawing Sheets

(56) References Cited

U.S. PATENT DOCUMENTS

| | | | | |
|---|---|---|---|---|
| 2024/0143189 | A1* | 5/2024 | Dong | G06F 3/0644 |
| 2024/0160387 | A1* | 5/2024 | Neelakantam | G06F 3/0607 |
| 2024/0403171 | A1* | 12/2024 | Dhavale | G06F 11/1469 |

* cited by examiner

COLLABORATIVE MULTILEVEL ERASURE CODING FOR MAXIMIZING DURABILITY AND PERFORMANCE OF STORAGE SYSTEMS

CROSS REFERENCE TO RELATED APPLICATIONS

This application is a continuation of U.S. application Ser. No. 18/902,183, filed Sep. 30, 2024, which is incorporated by reference in its entirety.

BACKGROUND

1. Field of the Disclosure

The present disclosure relates to storage systems in general and more specifically to using collaborative multilevel erasure coding for increasing durability and performance of storage systems.

2. Description of the Related Art

High Performance Computing (HPC) systems solve large computational problems by aggregating multiple computing resources. Examples of such computational problems include data-intensive artificial intelligence applications, analytics applications, numerical analysis, and so on. HPC workloads handle large amount of data that keeps increasing as more and more challenging problems are handled. To handle such problems, high performance storage and data management is required. Such high performance storage and data management is often achieved by using parallel file systems that allow several clients to store and access shared data across multiple networked storage nodes by using parallel I/O paths. Parallel file systems may use RAID (redundant array of inexpensive disks) data storage that combines multiple physical disk drive components into logical units for achieving data redundancy and/or performance improvement. Such storage systems are designed to handle failure of storage nodes. Failure of storage nodes degrades performance.

SUMMARY

Embodiments relate to failures of storage systems. A file system stores data in a hierarchical storage system comprising a plurality of levels of storage units. A storage unit may be a storage device at a lower level of the hierarchy, a storage node at a higher level of the hierarchy, or a cluster of storage nodes. A storage unit at a higher level comprises a plurality of storage units at a lower level. A level comprises a plurality of storge units storing redundant data, e.g., parity data storing information that can be used to perform reconstruction of data at one or more storage units at the level in case of failures of those storage units.

The storage system receives an indication of failure of a storage unit Sx at the lower level Lx. The storage unit Sx is associated with a storage unit Sy at the higher level Ly. Responsive to receiving the indication of failure of the storage unit Sx at the lower level Lx, the storage system indicates the storage unit Sy at the higher level Ly as failed. The storage system initiates reconstruction of data at the storage unit Sy based on redundant data stored at one or more other storage units at the higher level Ly.

The storage system further receives an indication of failure of one or more other storage units at the higher level Ly. If the number of failed storage units at the higher level Ly exceeds a threshold value, the storage system indicates that the storage unit Sy is available so that Sy can be used for processing data access requests. The storage system initiates reconstruction of data at the storage unit Sx using redundant data stored in other storage units at the lower level Lx that are associated with the storage unit Sy.

According to an embodiment, the steps described herein are executed as a process. According to an embodiment, a non-transitory computer readable storage medium comprising stored program code including instructions that when executed by one or more computer processors, cause the one or more computer processors to perform the steps of the methods described herein. Other embodiments include computer systems that include one or more processors and a non-transitory computer readable storage medium comprising stored program code including instructions that when executed by the one or more computer processors, cause the one or more computer processors to perform the steps of the methods described herein.

BRIEF DESCRIPTION OF THE DRAWINGS

The teachings of the embodiments can be readily understood by considering the following detailed description in conjunction with the accompanying drawings.

Figure 1:
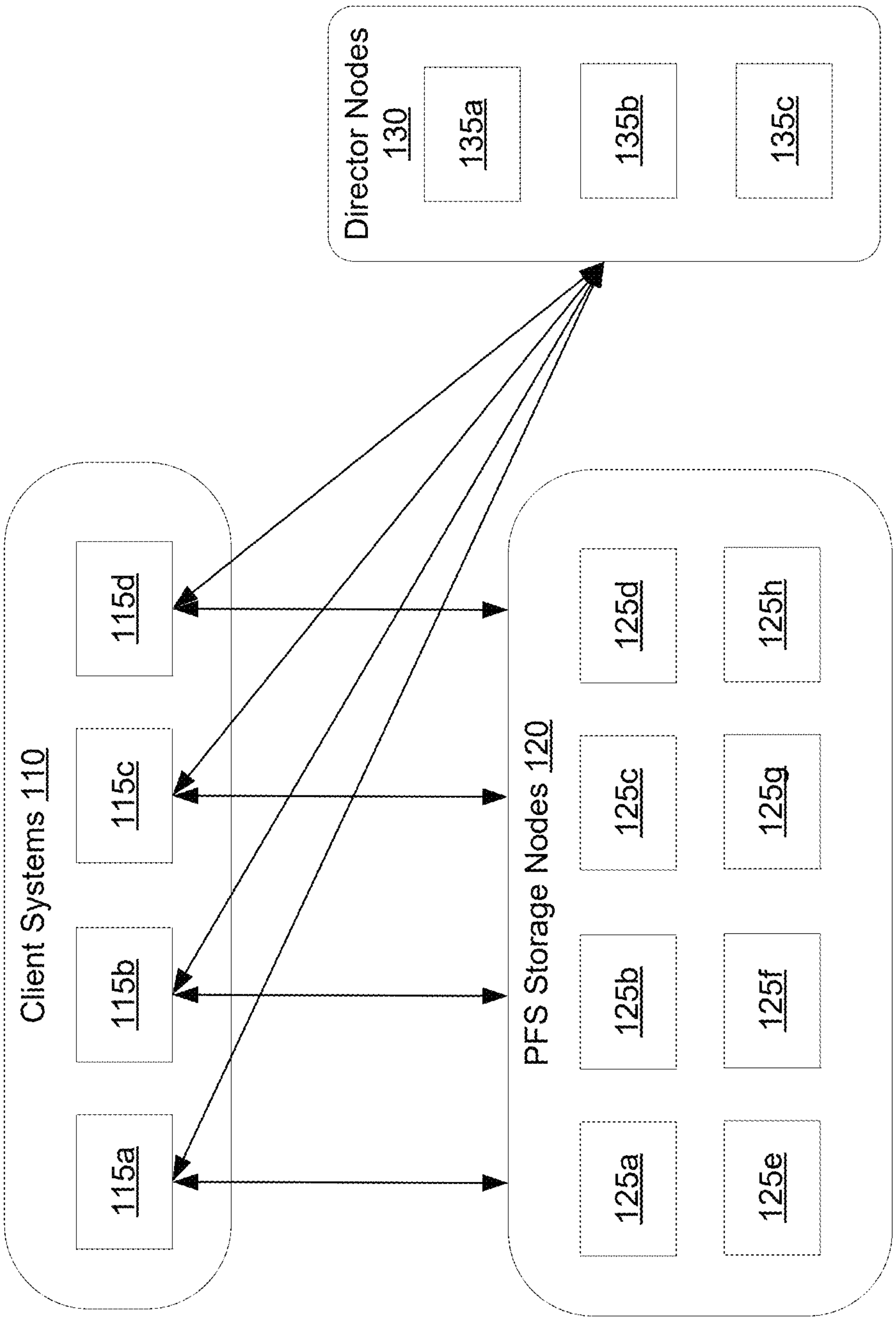
FIG. 1 illustrates the various components in the system environment of a parallel file system, according to an embodiment.

The Figures (FIG.) and the following description relate to preferred embodiments by way of illustration only. It should be noted that from the following discussion, alternative embodiments of the structures and methods disclosed herein will be readily recognized as viable alternatives that may be employed without departing from the principles of the embodiments.

Reference will now be made in detail to several embodiments, examples of which are illustrated in the accompanying figures. It is noted that wherever practicable, similar or like reference numbers may be used in the figures and may indicate similar or like functionality. The figures depict embodiments for purposes of illustration only.

DETAILED DESCRIPTION

A parallel file system uses multiple storage nodes and performs parallel and redundant access to data storage nodes to deliver high performance data access with scalability and reliability. The PFS uses a storage system that includes multiple storage nodes (also referred to as servers) and storage devices. Examples of storage devices include HDD (hard disk drive) and SSD (solid state drive.) The storage system is built as a resilient platform, such that when components fail, the system repairs itself to maintain availability and durability of the data. The components of the storage system that are most likely to fail are the storage devices (e.g., HDDs) on which most of the data is stored upon. Other components may also fail depending on their MTBF (mean time between failure)/AFR (annualized failure rate).

The storage system triggers a reconstruction operation that rebuilds data that is no longer at its most resilient state due to component failures. The reconstruction can significantly impact the performance (represented using QoS or quality of service) of the system. Users want to be able to maximize the system reliability but not at the cost of system performance The storage system according to various embodiments, maximizes data durability while at the same time maximizing the performance of the system. The storage system may offer a single level of erasure coding across storage nodes. Accordingly, if a single storage device (e.g., HDD) fails, the storage node (or server) attached to the storage device is taken offline and a data reconstruction process is started. The reconstruction process rebuilds data of the storage node using redundant data stored in other storage nodes at that level of the hierarchy. The redundant data may be parity data.

According to an embodiment, the storage system uses a hierarchy of storage units, where a storage unit is either a storage node, a storage device, or a group of storage nodes and supports multilevel erasure coding (MLEC). The storage system adds erasure coding at each level of the hierarchy of the storage units. For example, in a two layer storage system that includes a higher layer of storage nodes and a lower layer of storage devices such as HDDs, the storage system supports erasure coding at both levels, i.e., the storage node layer as well as at the HDD layer. Accordingly, when a storage device fails the node can repair itself without invoking the reconstruction operations that span the cluster. The data of the storage device is reconstructed using redundant data stored in other storage devices of the storage node. Alternatively, when a storage device fails, the system fails the entire storage node and performs reconstruction at the cluster level using redundant data stored in other storage nodes of the cluster. By adding the erasure coding at multiple levels, the system has more degrees of freedom to work collaboratively to reconstruct in different ways to maximize the durability and performance of the system per the needs of the users.

FIG. 1 illustrates the various components in the system environment of a PFS, according to an embodiment. The system environment of the PFS includes a set 110 of client systems 115*a*, 115*b*, 115*c*, 115*d*, a set 120 or storage nodes 125*a*, 125*b*, 125*c*, 125*d*, 125*e*, 125*f*, 125*g*, 125*h* and a set 130 of director nodes 135*a*, 135*b*, 135*c*. The director nodes 135 and storage nodes 125 are computer systems that run the parallel file system. A client system 115 includes a client driver that is a loadable software module that interacts with the director nodes and storage nodes to read and write the files stored by the parallel file system. Any required administration is performed via a graphical user interface (GUI) or call level interface (CLI) running on a director node 135. All the director nodes and storage nodes work together to provide a single file system namespace referred to as a realm.

According to an embodiment, the PFS separates the control plane from the data plane. The director nodes 135 in the PFS form the control plane. The director nodes 135 perform various tasks including caching and modifying file system metadata (e.g., directories, file attributes, access permissions, etc.), coordinating the actions of the storage nodes 125 and the client drivers for file accesses, managing membership status of director and storage nodes within the PFS storage cluster, and controlling all failure recovery and data reliability operations. According to an embodiment, director nodes 135 are commodity compute servers with a high-speed networking connection, significant DRAM capacity, and a persistent store for transaction logs.

Storage nodes in the PFS form the data plane. Storage nodes represent the component of the overall architecture that stores data or metadata. While director nodes serve and modify file system metadata, they use storage nodes to store the metadata. The client driver is a loadable file system that is installed on compute servers and used by application programs running on a client system like any other file system. The client driver works with the director nodes and storage nodes to deliver a POSIX-compliant and cache-coherent file system behavior. Each file stored by the PFS is individually striped across many storage nodes, allowing each component piece of a file to be read and written in parallel, increasing the performance of accessing each file. For each file that the application wants to access, the client driver on the client system communicates over the network directly to all the storage nodes that hold that file's data.

The PFS scales out both director nodes 135 and storage nodes 125. For any given configuration of the system, additional director nodes can be added for more metadata processing performance. Similarly additional storage nodes can be added for more capacity or more storage performance.

Figure 2:
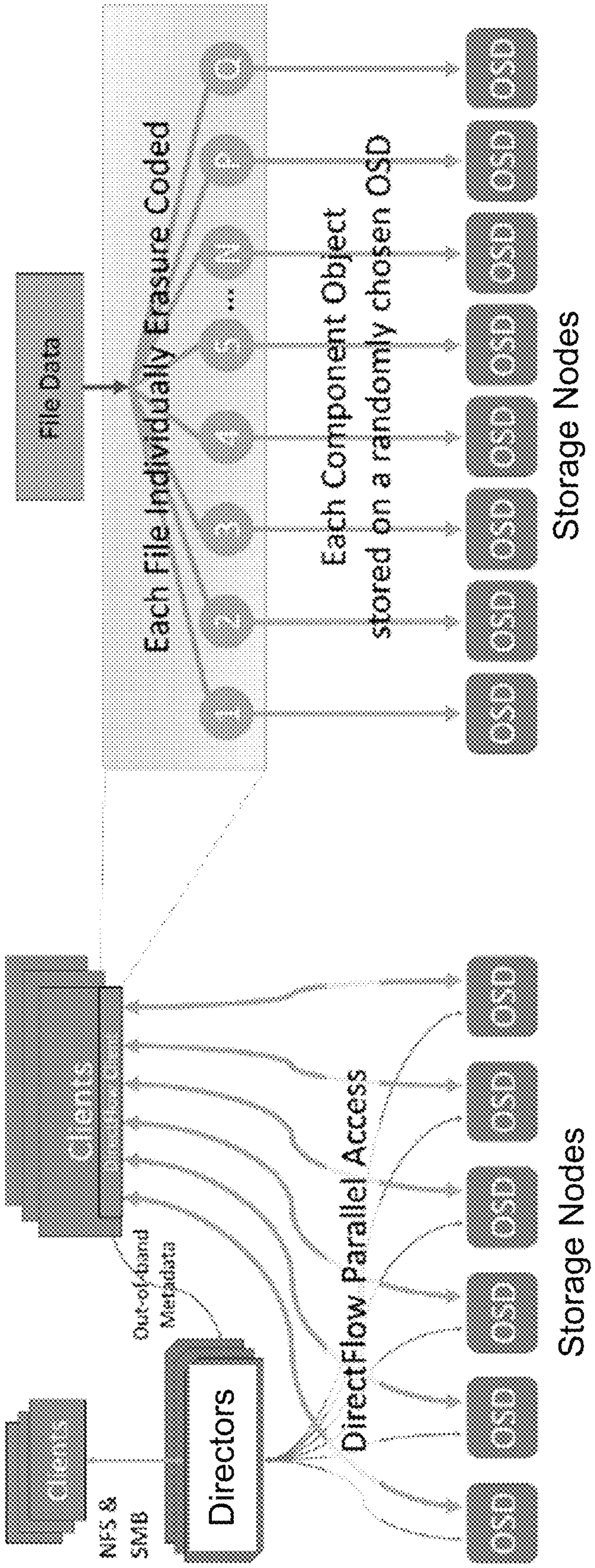
FIG. 2 illustrates how data is stored in a file in the parallel file system, according to an embodiment.

FIG. 2 illustrates how data is stored in a file in the parallel file system, according to an embodiment. The PFS uses multiple storage nodes by assigning a map to each file. The map for a file shows where all the striped component parts of that file are located, and which storage node holds each part. The client driver uses the map to determine which storage nodes to access, directly or in parallel. PFS uses network erasure coding as part of that striping to ensure data integrity and reliability.

The client driver provides the semantics of a locally-mounted, POSIX-compliant file system. The PFS ensures that if a process P2 (possibly on another compute server) is writing to a file at the same time the process P1 is reading from the file, this process P1 will not read stale data. Accordingly, PFS provides cache coherency across all the nodes running the client driver.

PFS performs random assignment of component objects to storage nodes to spread the load from file accesses across all those nodes. Typically, the number of storage nodes is much larger than the typical stripe width of a file. As a result, each file is very likely to only share a few storage nodes with any other files. This reduces the odds of any one storage node becoming overloaded and impacting the performance of the whole realm. As a result, the PFS provides a consistent system performance.

According to an embodiment, the PFS performs active capacity balancing to maintain consistent system performance. If the system load balance is off by more than a threshold, for example, if many files are deleted at once and a storage node is significantly less utilized compared to others, the director nodes examine utilization of all the storage nodes and transparently move component objects from over-loaded storage nodes to underutilized storage nodes.

Figure 3:
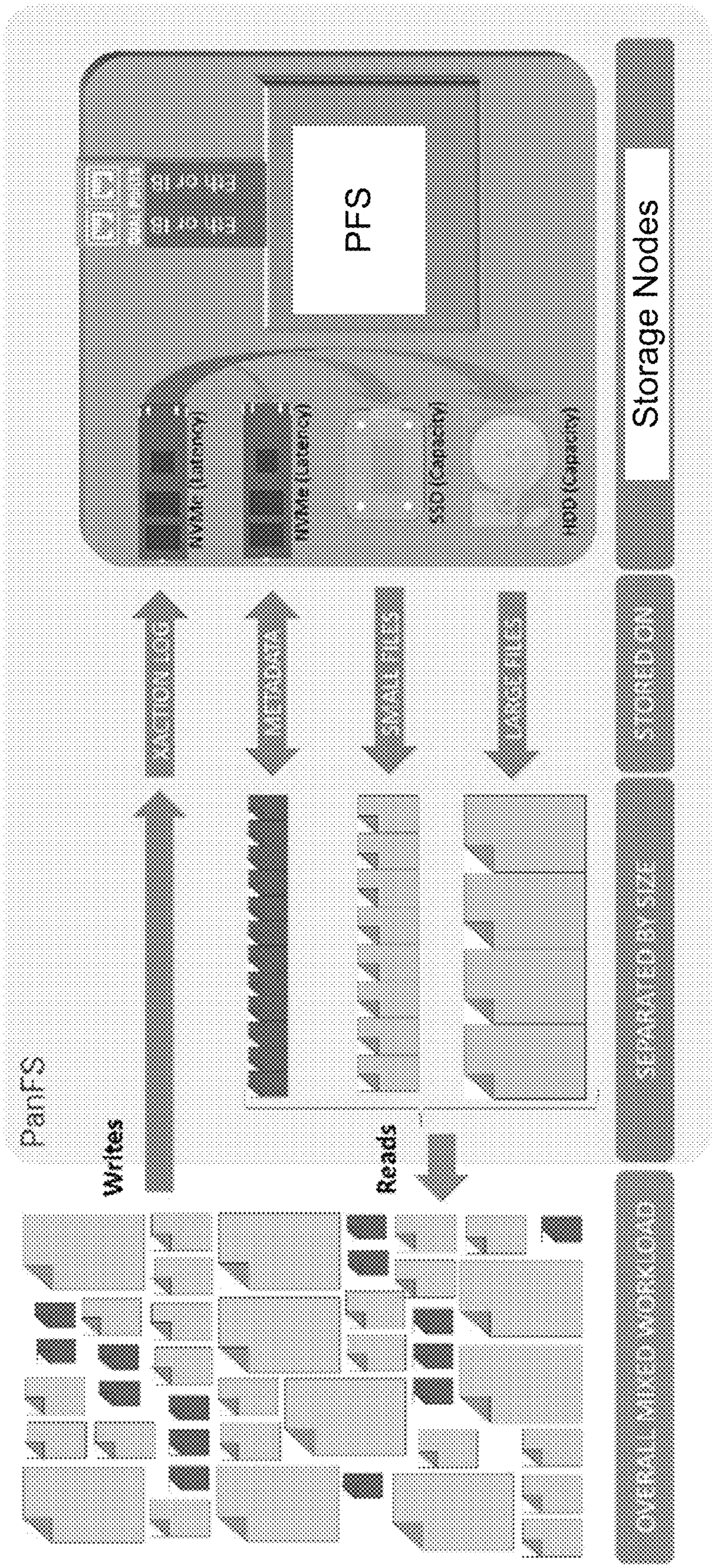
FIG. 3 illustrates the operation of storage nodes of the PFS, according to an embodiment.

FIG. 3 illustrates the operation of storage nodes of the PFS, according to an embodiment. The PFS architecture provides performance and reliability advantages as well as significant performance optimizations using the storage node software to enable efficient use of the available storage media inside each storage node. The PFS storage node handles multiple performance tiers of storage. According to an embodiment, the different performance tiers of a storage node include including storage class memory such as CXL (Compute Express Link's) persistent memory, latency optimized NVMe (non-volatile memory express) SSDs (solid state drives), capacity optimized SSDs, and HDDs (hard disk drives).

The storage node separates the storage of metadata from the storage of data. Metadata is usually composed of very small records that are accessed in unpredictable patterns and are typically latency sensitive. Directories are also metadata and are latency sensitive, that is often accessed sequentially. As a result of being small, typically having unpredictable access patterns, and being latency sensitive, the storage node stores metadata using a different storage mechanism than files storing user data, which are typically much larger and accessed sequentially. The storage node stores metadata in a database in one of the higher tiers of storage drives, typically an NVMe SSD, and stores bulk user file data in one of the lower tiers of drives, typically capacity-optimized SSDs or HDDs. The storage node uses the highest available tier of storage drives for storing a transaction log, committing the incoming data, metadata, or operations to stable storage, therefore allowing the application to continue its processing as quickly as possible.

The PFS takes advantage of the DRAM in each storage node as a low-latency cache of the most recently read or written data and metadata. The storage node stores small component objects in capacity-optimized SSDs that provide cost-effective and high-bandwidth storage. A POSIX file of less than a threshold size, for example, less than 1.5 MB size may be fully stored on SSDs. The PFS tries to keep each SSD full above a threshold level, for example, above 80% full. If an SSD falls below that threshold level, the PFS selects the smallest component objects from the next slowest set of drives and moves them to the SSD until it is about 80% full. If the SSD is too full, PFS moves the largest component objects on the SSD to the next slower tier of drives. Every storage node performs this optimization independently and continuously. A storage node selects component objects to move by looking in its local metadata database.

Storage nodes in the PFS are object storage devices (OSDs). An object stored in an OSD is a Small Computer System Interface (SCSI) object. The PFS can be configured to create a blade set (BladeSet) for different classes of storage nodes. For example, storage nodes with a capacity of 280 TB each should not be combined into the same blade set as storage nodes with a capacity of 132 TB each. This helps to evenly spread the workload across the pool of storage nodes and avoid hotspots. According to an embodiment, the PFS supports multiple blade sets in a realm and in the same namespace at the same time.

Figure 4:
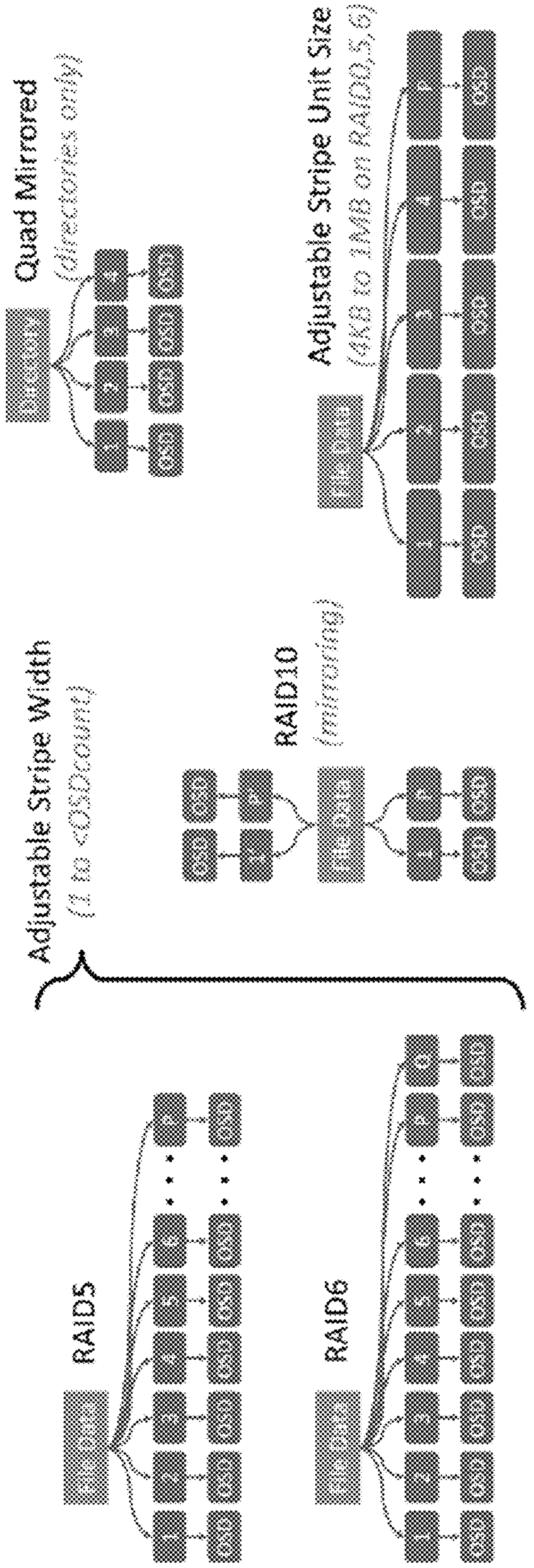
FIG. 4 shows the details of layout of a file stored in the PFS, according to an embodiment.

FIG. 4 shows the details of layout of a file stored in the PFS, according to an embodiment. The PFS stripes a large POSIX file across a set of component objects and adds additional component objects into that stripe that store a plurality of data protection values, for example, the P and Q data protection values of an N+2 erasure coding scheme. P data represents parity data and Q data represents Q-parity data. The PFS stores large POSIX files using erasure coding across multiple component objects, and store small POSIX files using triple-replication across three component objects. This approach delivers higher performance and makes it more space efficient. Unless the first write to a file is a large one, the PFS starts as a small file. If a small file grows into a large file, the director node transparently transitions the file to the erasure coded format at the point that the erasure coded format becomes more efficient. When a file is created, and as it grows into a large file, the director node that is managing those operations randomly assigns each of the individual component objects that make up that file to different storage nodes. No two component objects for any file are assigned to the same failure domain.

If a PFS storage node fails, the PFS reconstructs only those component objects that were on the failed storage node. This is distinct from a RAID array that would reconstruct the entire raw capacity of the storage node. The PFS reads the component objects for each affected file from all the other storage nodes and uses each file's erasure code to reconstruct the component objects that were on the failed node.

When a BladeSet in the PFS is first set up, the PFS sets aside a configurable amount of spare space on all the storage nodes in that BladeSet to hold the output from file reconstructions. When the PFS reconstructs a missing component object, it writes it to the spare space on a randomly chosen storage node in the same BladeSet. As a result, during a reconstruction the PFS uses the combined write bandwidth of all the storage nodes in that BladeSet. The increased reconstruction bandwidth reduces the total time to reconstruct the affected files, which reduces the odds of an additional failure during that time, thereby increasing the overall reliability.

The N+2 erasure coding implemented by the PFS protects against two simultaneous failures within any given BladeSet without any data loss. More than two failures in a realm are automatically and transparently recovered from, as long as there are no more than two failed storage nodes at any one time in a BladeSet.

If a third storage node were to fail in a BladeSet while two others were being reconstructed, that BladeSet would immediately transition to read-only state, as a result. Only the files in the BladeSet that had component objects on all three of the failed storage nodes would have lost data, which becomes a smaller and smaller percentage as the size of the BladeSet increases. All other files in the BladeSet are unaffected or recoverable using their erasure coding.

Since the PFS maintains a complete directory tree, it can identify the full pathnames of precisely which files need to be restored from a backup or reacquired from their original source, and can therefore also recognize which files were either unaffected or recovered using their erasure coding.

Hierarchical Storage System

Figure 5:
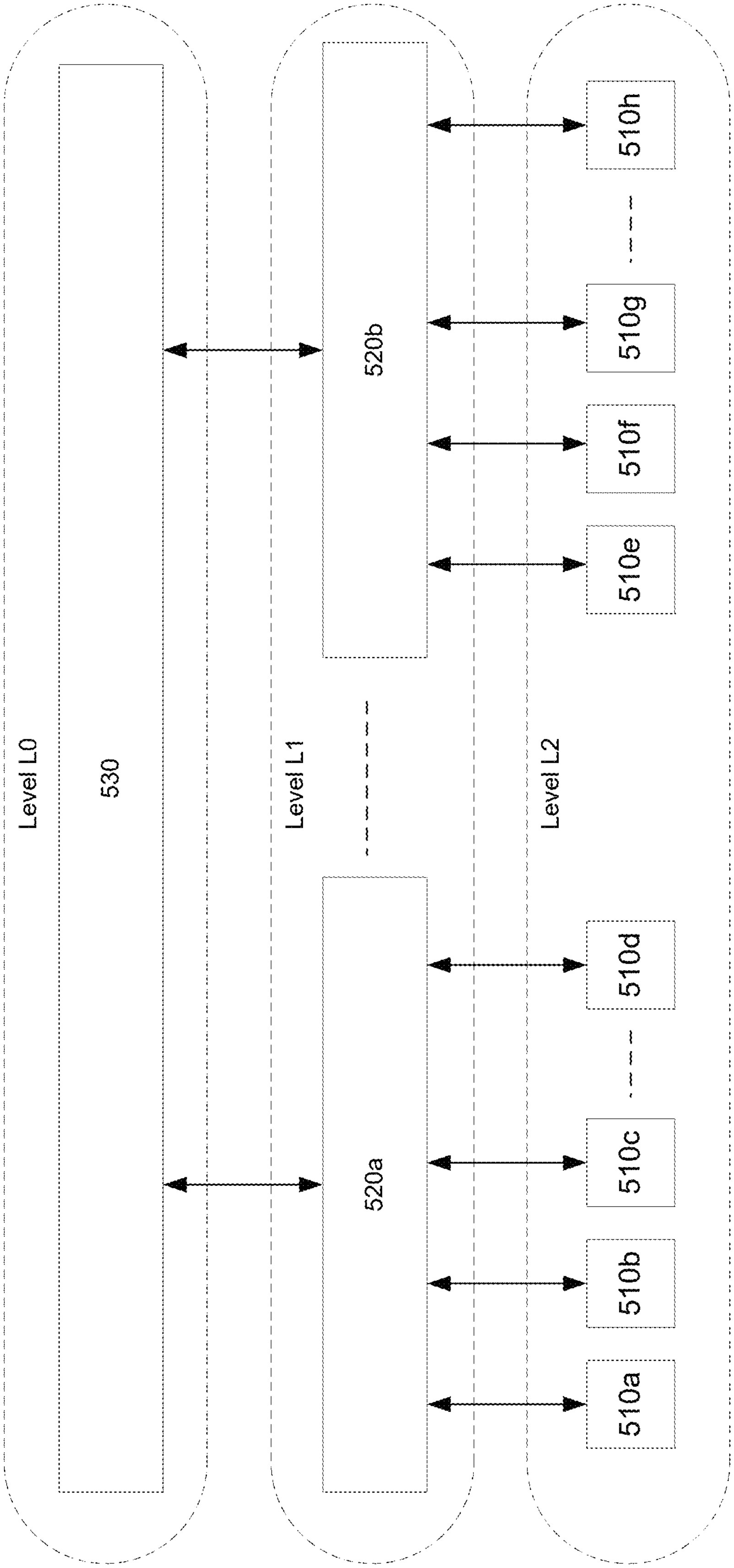
FIG. 5 shows a hierarchical storage system including storage units at various levels, according to an embodiment.

FIG. 5 shows a hierarchical storage system including storage units at various levels, according to an embodiment. A storage unit may be a storage device, for example, a hard drive (HDD, SSD, etc.) or a storage node that includes multiple other storage units, for example, a server or a cluster of servers.

The example storage system illustrated in FIG. 5 has three levels, level L0, level L1, and level L2. Level L2 is the lowest level and level L0 is the highest level. Groups of storage units at a particular level are associated with a storage unit at the higher level. For example, storage units 510a, 510b, 510c, . . . and 510d at level L2 form a group of storage units associated with the storage unit 520a at the level L1. Similarly, storage units 510e, 510f, 510g, . . . and 510h at level L2 form a group of storage units associated with the storage unit 520b at the level L1. Furthermore, storage units 520a, 520b at level L1 form a group associated with storage unit 530. In the example, illustrated in FIG. 5, the level L2 may represent storage devices such as hard drives, level L1 may represent servers, and level 0 may represent clusters of servers.

The hierarchical storage system performs data reconstruction using multiple levels of erasure coding. Each level of the storage system has at least one redundancy term, for example, RAID1/RAID5 or more redundancy. Furthermore, the storage system supports two way communication between levels. Accordingly. if the lowest level has a HDD failure, the storage devices at the lowest level can notify the storage nodes at the level above it. Similarly, a higher level can instruct a lower level below it to operate in particular ways.

Figure 6:
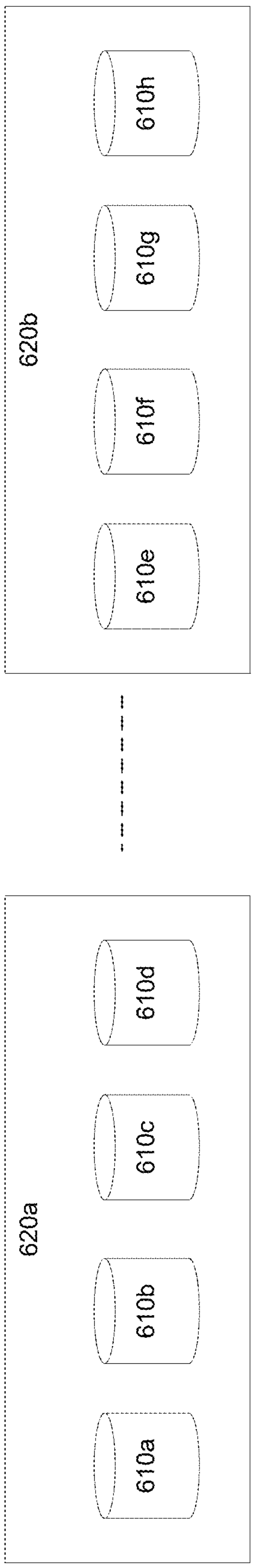
FIG. 6 shows a hierarchical storage system with two levels having storage nodes and storage devices, according to an embodiment.

FIG. 6 shows a hierarchical storage system with two levels having storage nodes and storage devices, according to an embodiment. The storage system shown in FIG. 6 has a two level hierarchy including a lower level comprising storage devices 610 and a higher level comprising storage nodes 620 (also referred to as servers). Each storage node 620 stores data in a plurality of storage devices 610. For example, server 620a stores data in storage devices 610a, 610b, 610c, and 610d and storage node 620b stores data in storage devices 610e, 610f, 610g, and 610h. The number of storage devices 610 storing data for a storage node 620 can be different from that shown in FIG. 8. For example, a storage node 620 may store data on a larger number of storage devices 610 than indicated in FIG. 6. The storage devices 610 of a storage node store redundant data, for example, parity data that can be used to reconstruct data of a particular storage device, in case of data loss at the particular storage device.

Handling Failures in Storage System

The storage system has multiple levels of erasure coding and has different collaborative processes that are used to maximize data durability as well as the system performance while the system is repairing itself from failures. The parallel file system has precise knowledge of location of all the data. This allows system to make optimizations, for example, by determining which part of data is reconstructed at which level of the storage system. The system can perform reconstruction of data using multilevel erasure coding without detailed knowledge of all pieces of data as well.

According to an embodiment, if a storage node fails, then a higher level erasure coding reconstruction process is executed. If a storage device (e.g., HDD/SSD), i.e., a storage unit at a lower level fails then the storage device notifies the storage units at the upper level of the failure and enters a degraded state. The storage system further determines how to reconstruct the data according to various embodiments as follows.

According to an embodiment, the system does not perform any reconstruction in spite of failure of a storage device (or any storage unit at lower level). The system may determine not to reconstruct for various reasons, for example, because the storage system has no spare space or place to rebuild.

According to another embodiment, the lower level storage unit, for example, the storage device reconstructs the lost data. The parallel file system blocks any new data from being put on storage nodes that are reconstructing. This allows the storage node to have less interference from normal operation to allow more system bandwidth to be applied to the reconstruction process. This improves system reliability because the data reconstruction can finish faster and improves user quality of service (QOS) as new file writes can go to storage nodes where reconstruction is not running.

According to another embodiment, the system performs reconstruction at a higher level, for example across storage units at a higher level, even though the failure occurred at a storage device at lower level. The system uses redundant data, for example, parity data stored at other nodes of the higher level to reconstruct data of the storage node.

According to another embodiment, the reconstruction of the lost data is performed at the higher and the lower level concurrently and there are a few different options for how the system processes the reconstruction. According to one embodiment both the higher and the lower level start reconstruction process (or tasks). The higher and the lower level collaborate with each other to ensure that they are processing distinct portions of the data stored on the storage device that failed. This way, the higher and the lower level avoid overlap of the data that is being reconstructed, thereby avoiding duplication of effort. For example, if the storage device can be represented as a storage region on which data is stored, the storage units of the higher level of the storage system start processing data of the region from one end and the lower level starts processing data from the other end of the region. According to an embodiment, the reconstruction stops when the higher level and the lower level meet, indicating that the processing of the data is completed.

The storage units at the higher and the lower level may run reconstruction independently and concurrently. Since the storage units at the higher level runs the reconstruction, the storage node is treated as if it has failed. As a result, no data access requests are sent to the storage node. This allows the storage devices at the lower level to run the reconstruction process without any competing workload and the lower level reconstruction process runs more efficiently and faster.

If the reconstruction process running at the higher level completes execution, the storage system may abort the lower level reconstruction. According to an embodiment the data reconstruction is performed simultaneously and the storage units at the higher level and lower level communicate with each other during the reconstruction to monitor the progress. If the storage units at the higher level reach a stage where the data being reconstructed starts overlapping the data being reconstructed by the lower level (or is close to a point where the overlap may start), the storage system provides instructions to the storage units at the lower level to stop reconstruction. Accordingly, the data reconstruction at the lower level may be finished early and the data reconstruction at the higher level may be (1) either already completed or (2) continued until the all data that needs to be reconstructed is fully reconstructed. The system may reinitialize the lower level reconstruction after swapping the failed storage device (e.g., disk). The storage system informs the storage units at the lower level regarding the status of data reconstruction and storage units at the lower level update their status and process any book keeping issues, for example, update metadata as needed. For example, the data reconstruction at the lower level may use a new storage device or use available spare capacity for rebuilding and will update the metadata accordingly. If a second storage node at the higher level fails in the storage system, the storage system may revive the original storage node and let the lower level reconstruction finish.

According to an embodiment, when the storage units at both higher and lower levels run reconstruction independently as described herein, the storage system does not use coordination to ensure they don't process overlapping regions. Accordingly, the higher level may finish all its reconstruction work (of recovering from a complete loss of the lower storage unit). As a result, any data on the lower storage unit is no longer needed. Instead of figuring out exactly what work was duplicated by the lower reconstruction, the storage system simply reinitializes the lower storage unit to empty (discarding all the data on it).

The storge system makes a choice between which approach to use: (1) reinitialize the lower storage unit or (2) clean up data on the lower storage unit that the higher level has already reconstructed based on which approach is easier or quicker. The storage system determines estimates of the amount of work required for completing the data reconstruction based on the two approaches and selects the approach that requires less overall effort to complete the overall data reconstruction. Both approaches may result in the same final state where all data is fully redundant at the higher level and there are no extra copies at the lower level.

The reconstruction of data at the higher level may be performed so long as the number of storage nodes failed is below a predefined threshold T. For example, the parity data may be computed and stored such that the storage system can tolerate at most two storage node failures at the higher level. According to an embodiment, there may be two storage nodes at the higher level that are failed at the same time. The storage system starts reconstruction at the higher level storage nodes for the two storage nodes independently. If a third storage node also fails, i.e., the number of storage node failures exceed the predefined threshold T, the system revives one or more of the storage nodes that previously failed and indicates them as not failed. The reconstruction of those storage nodes is performed at the lower level, i.e., at the storage device level. However the one or more storage nodes that were previously indicated as failed can now process data access requests. This way the number of storage node failures at the higher level is below the predefined threshold T and the reconstruction at the higher level can be performed. The system is able to revive a storage node because the reason the storage node was marked as failed was to not create a hotspot on the storage node to allow the reconstruction process to proceed without interruptions from data access requests. If the storage node that was previously indicated as failed is revived, data access requests are sent to the storage node and the storage node is able to perform reconstruction of data at the lower level across storage devices, although relatively slowly since the storage node is not entirely dedicated to performing the reconstruction process.

Figure 7:
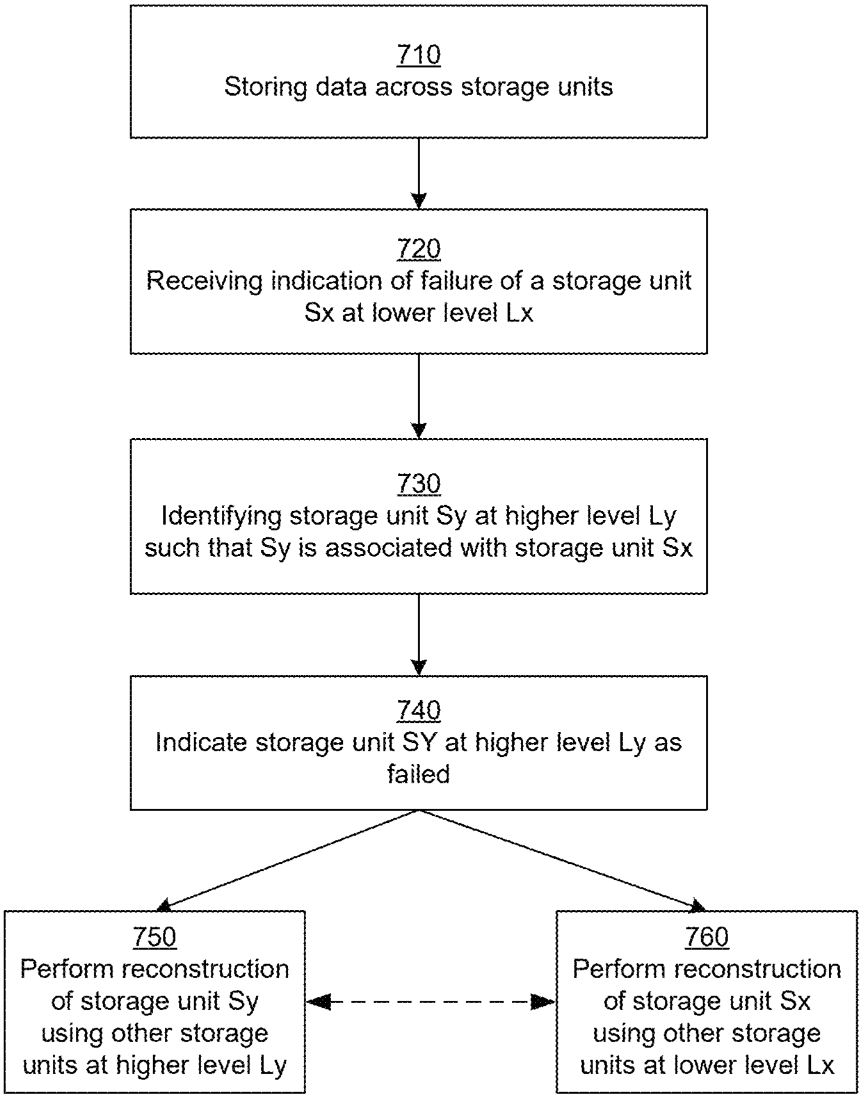
FIG. 7 is a flowchart illustrating the process of handling failures in storage units at lower levels, according to an embodiment.

FIG. 7 is a flowchart illustrating the process of handling failures in storage units at lower levels, according to an embodiment. The steps may be performed by a system, for example, a storage system. The steps may be performed in an order that is different from that indicated in FIG. 7, for example, some steps may be performed in parallel or in a different order.

The storage system stores 710 data across multiple storage units, for example, a file may be stored across multiple storage units of a lower level Lx ((e.g., storage devices) of the hierarchy of storage of the storage system illustrated in FIG. 5. The storage system receives 720 an indication of failure of a storage unit of the lower level. For example, a storage device Sx (such as a HDD/SSD) at lower level Lx may fail. The storage system identifies 730 a storage unit Sy at a higher level Ly, such that Sy that is associated with the storage unit Sx. The storage unit Sy may comprise a plurality of storage units at the lower level including Sx. For example, Sx may be a storage device at lower level Lx and the storage unit Sy may be a server or a storage node at higher level Ly that comprises a plurality of storage devices at lower level Lx including storage device Sx. The storage system indicates 740 the storage unit Sy at the higher level Ly as failed even though not all storage devices of the storage unit Sy have failed and the storage unit Sy could potentially be used for data access. The storage system indicates the storage unit Sy at the higher level Ly as failed so that reconstruction of data of storage device Sx at lower level Lx can be performed efficiently without any interruptions caused by data access requests. The storage system performs 750 reconstruction of data of storage unit Sy at higher level Ly using redundant data (such as parity data) stored in other storage units at the higher level Ly. Optionally, the storage system may perform 760 reconstruction of data of storage unit Sx at lower level Lx using redundant data (such as parity data) stored in other storage units at the lower level Lx. The steps 750 and 760 may perform interactions with each other to coordinate the reconstruction effort. For example, the storage system may determine which portion of the data is reconstructed using parity data at the higher level Ly and which portion of data is reconstructed using parity data at the lower level Lx.

Depending on the redundancy of information stored at the higher level, the storage system is able to tolerate a threshold number T of failed storage units at the higher level. For example, if another storage device Sx failed at the lower level Lx, the system may identify a storage unit Sw at the higher level Ly and indicate that as failed if the storage system is configured to tolerate up to two storage unit failures at the higher level Ly. However if there are further failures of storage units at the higher level Ly, causing the number of failed storage units at the higher level Ly to exceed the threshold value T representing the number of storage units that can be tolerated at the higher level, the system performs the following process illustrated in FIG. 8 to allow the system to continue data reconstruction.

Figure 8:
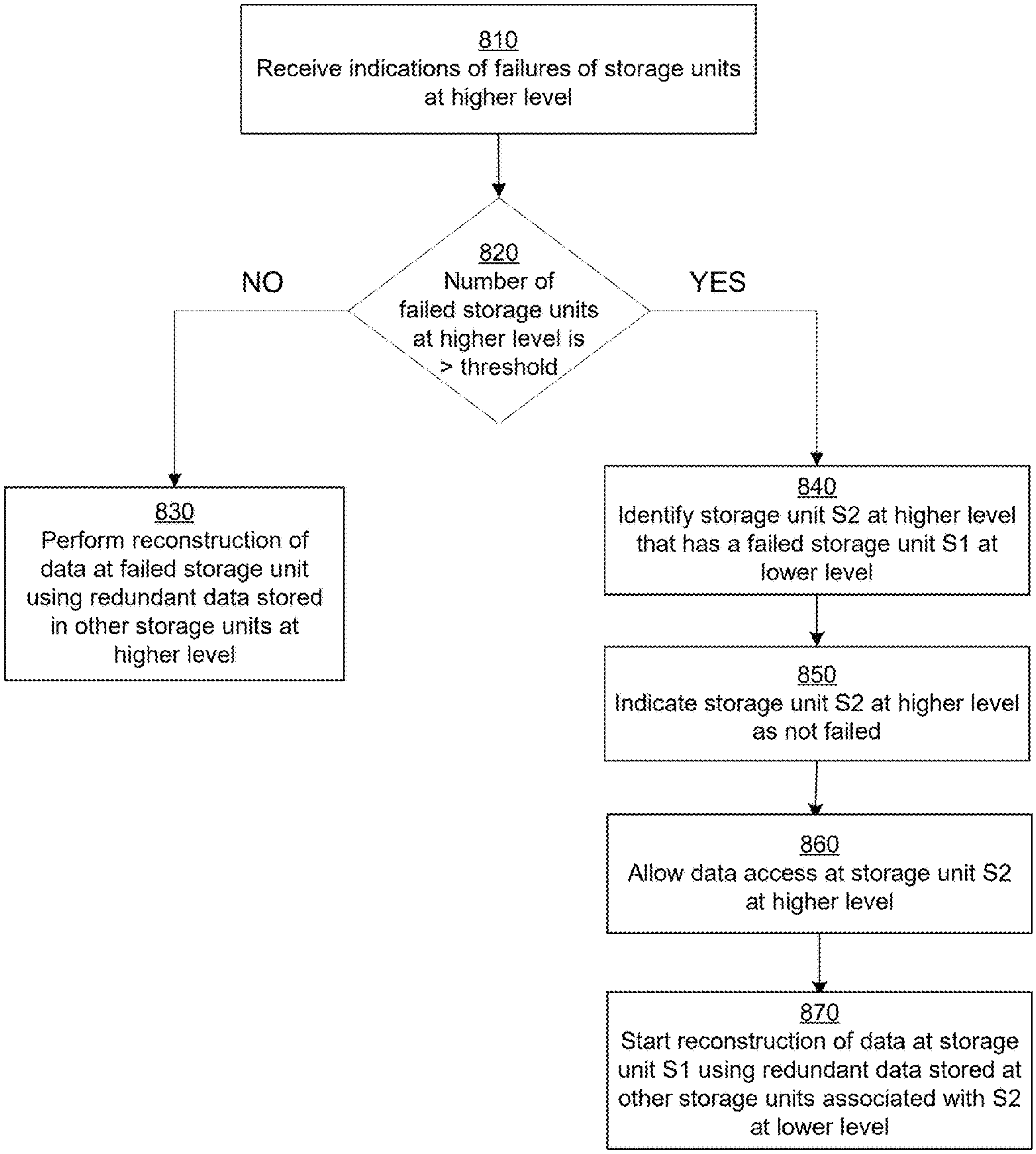
FIG. 8 is a flowchart illustrating the process of handling failures in storage units at higher levels, according to an embodiment.

FIG. 8 is a flowchart illustrating the process of handling failures in storage units at higher levels, according to an embodiment. The steps may be performed by a system, for example, a storage system. The steps may be performed in an order that is different from that indicated in FIG. 7, for example, some steps may be performed in parallel or in a different order. The system receives one or more indications of failure of storage units at a higher level. These failures may represent failures of entire storage units at the higher level or caused by failures of one or more storage units at the lower levels as illustrated in FIG. 7. The system determines 820 whether the number of failed storage units at the higher level is above the predefined threshold T.

If the storage system determines 820 that the number of failed storage units at the higher level does not exceed the threshold T, the storage system performs 830 reconstruction of data at the failed storage unit identified at the higher level using redundant data stored at other storage units at the higher level. If the storage system determines 820 that the number of failed storage units at the higher level exceeds the threshold T, the system is unable to perform restoration of data of the failed storage units at the higher level using redundant data stored at other storage units at the higher level since the redundant data (such as parity data) is configured to allow reconstruction only if the number of failed storage units at that level does not exceed the threshold T.

Accordingly, the system performs the following steps to perform reconstruction of data. The storage nodes at lower level may be configured to tolerate up to a threshold T2 number of failures of storage units. For example, if a storage unit S2 at the higher level (e.g., a server or storage node) stores data across a plurality P1 of storage units of lower level (e.g., storage devices), up to T2 failures of storage units out of the plurality P1 may be tolerated. The system identifies a storage unit S2 at higher level that was indicated as failed due to the failure of one or more storage nodes at lower levels. In particular, the storage system identifies a storage unit S2 at higher level that is associated with a plurality P1 of storage units at lower level and the number of failed nodes within the plurality P1 of storage units at lower level does not exceed the threshold T2. If none of the storage units at the higher level satisfy this criterion, the storage system may send an error message indicating that reconstruction may not be performed.

If the storage system is able to identify 840 a storage unit at the higher level that satisfies the above criterion, the system indicates 850 that the storage unit S2 at the higher level is not failed. This reduces the number of failures at the higher level to a number that does not exceed the threshold T and allows reconstruction of data at the higher level using redundant data stored at storage units at the higher level. Furthermore, since the storage unit S2 is indicated as not failed, the system allows 860 data access requests to the storage node S2. The system identifies a storage unit S1 at lower level that was indicated as failed and is associated with the storage unit S2. The system starts 870 reconstruction of data at the storage unit S1 using redundant data stored at other storage units at the lower level that belong to the plurality P1 of storage units.

According to an embodiment, the reconstruction of data at the storage unit S2 based on storage units at the higher level is performed concurrently with reconstruction of data at the storage unit S1 performed using redundant data stored at the lower level. Accordingly, a portion P1 of data is reconstructed using the redundant data stored in storage units at the higher level and a portion P2 of data is reconstructed using the redundant data stored in storage units at the lower level. The portions P1 and P2 are non-overlapping. The storage system performs collaboration between the storage unit S2 and the storage unit S1 to identify the portions P1 and P2 of data of the storage unit S1.

According to an embodiment, the storage system initiates a task T1 for performing reconstruction of data at the storage unit S2 based on storage units at the higher level and initiates a task T2 for performing reconstruction of data at the storage unit S1 based on storage units at the lower level. The tasks T1 and T2 are executed independently and concurrently.

According to an embodiment, if the storage system determines that reconstruction of data performed using the redundant data stored in storage units at the higher level is completed before the reconstruction of data performed using the redundant data stored in storage units at the lower level, the storage system provides instructions to stop execution of the task T2. Similarly, if the storage system determines that reconstruction of data performed using the redundant data stored in storage units at the lower level is completed before the reconstruction of data performed using the redundant data stored in storage units at the higher level, the storage system provides instructions to stop execution of the task T1.

Figure 9:
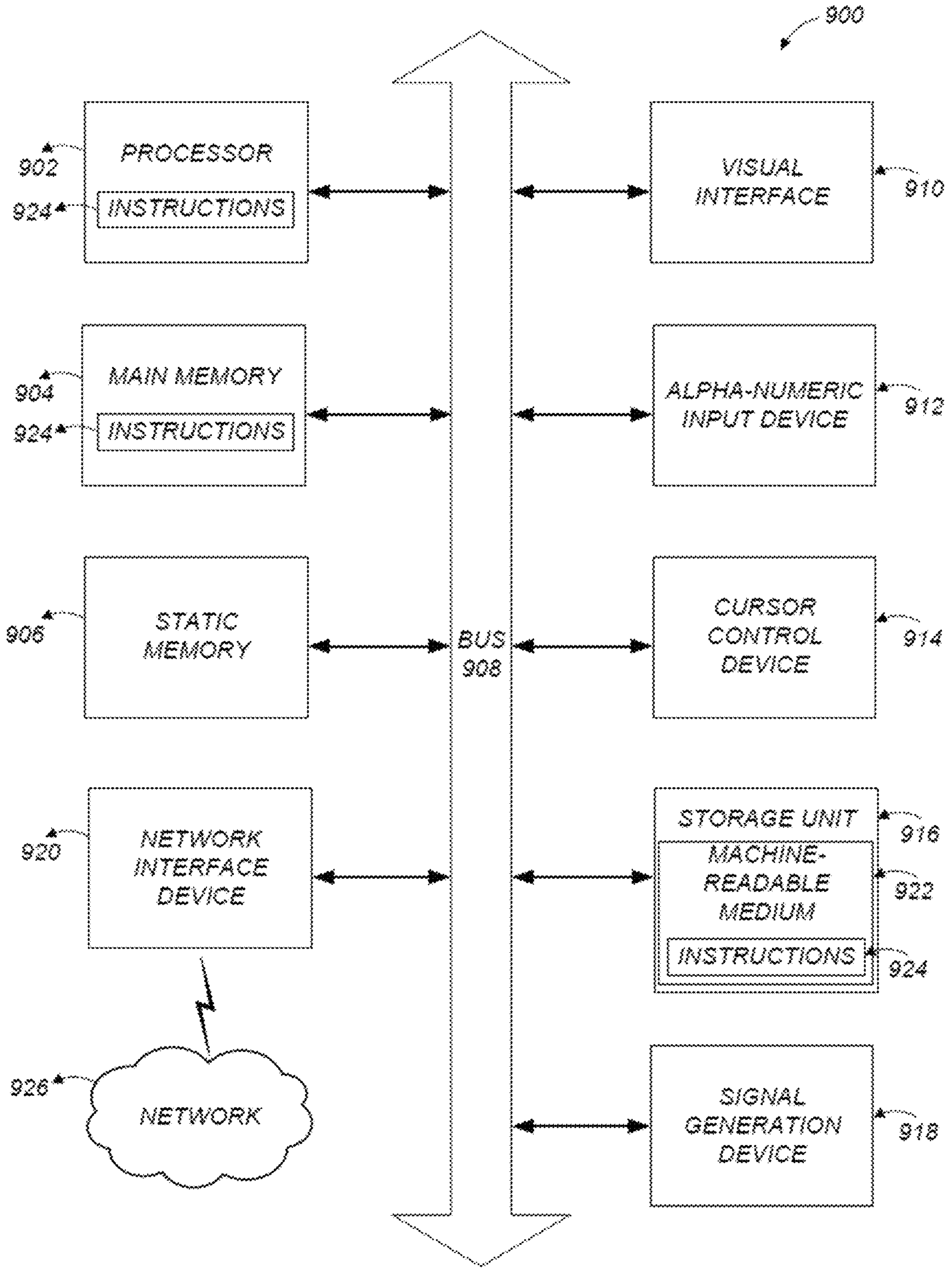
FIG. 9 is a block diagram illustrating components of an example computing system that is able to read instructions from a machine-readable medium and execute them in a processor (or controller) in accordance with one or more embodiments.

FIG. 9 is a block diagram illustrating components of an example machine able to read instructions from a machine-readable medium and execute them in a processor (or controller). Specifically, FIG. 9 shows a diagrammatic representation of a machine in the example form of a computer system 900 within which program code (e.g., software) for causing the machine to perform any one or more of the methodologies discussed herein may be executed. The program code may be comprised of instructions 924 executable by one or more processors 902. In alternative embodiments, the machine operates as a standalone device or may be connected (e.g., networked) to other machines. In a networked deployment, the machine may operate in the capacity of a server machine or a client machine in a server-client network environment, or as a peer machine in a peer-to-peer (or distributed) network environment.

The machine may be a computing system capable of executing instructions 924 (sequential or otherwise) that specify actions to be taken by that machine. Further, while only a single machine is illustrated, the term "machine" shall also be taken to include any collection of machines that individually or jointly execute instructions 924 to perform any one or more of the methodologies discussed herein.

The example computer system 900 includes one or more processors 902 (e.g., a central processing unit (CPU), a graphics processing unit (GPU), a digital signal processor (DSP), one or more application specific integrated circuits (ASICs), one or more radio-frequency integrated circuits (RFICs), field programmable gate arrays (FPGAs)), a main memory 904, and a static memory 906, which are configured to communicate with each other via a bus 908. The computer system 900 may further include visual display interface 910. The visual interface may include a software driver that enables (or provide) user interfaces to render on a screen either directly or indirectly. The visual interface 910 may interface with a touch enabled screen. The computer system 900 may also include input devices 912 (e.g., a keyboard a mouse), a cursor control device 914, a storage unit 916, a signal generation device 918 (e.g., a microphone and/or speaker), and a network interface device 920, which also are configured to communicate via the bus 908.

The storage unit 916 includes a machine-readable medium 922 (e.g., magnetic disk or solid-state memory) on which is stored instructions 924 (e.g., software) embodying any one or more of the methodologies or functions described herein. The instructions 924 (e.g., software) may also reside, completely or at least partially, within the main memory 904 or within the processor 902 (e.g., within a processor's cache memory) during execution.

Additional Considerations

The foregoing description of the embodiments has been presented for the purpose of illustration; many modifications and variations are possible while remaining within the principles and teachings of the above description.

Any of the steps, operations, or processes described herein may be performed or implemented with one or more hardware or software modules, alone or in combination with other devices. In some embodiments, a software module is implemented with a computer program product comprising one or more computer-readable media storing computer program code or instructions, which can be executed by a computer processor for performing any or all of the steps, operations, or processes described. In some embodiments, a computer-readable medium comprises one or more computer-readable media that, individually or together, comprise instructions that, when executed by one or more processors, cause the one or more processors to perform, individually or together, the steps of the instructions stored on the one or more computer-readable media. Similarly, a processor comprises one or more processors or processing units that, individually or together, perform the steps of instructions stored on a computer-readable medium.

Embodiments may also relate to a product that is produced by a computing process described herein. Such a product may store information resulting from a computing process, where the information is stored on a non-transitory, tangible computer-readable medium and may include any embodiment of a computer program product or other data combination described herein.

The language used in the specification has been principally selected for readability and instructional purposes, and it may not have been selected to narrow the inventive subject matter. It is therefore intended that the scope of the patent rights be limited not by this detailed description, but rather by any claims that issue on an application based hereon.

As used herein, the terms "comprises," "comprising," "includes," "including," "has," "having," or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive "or" and not to an exclusive "or". For example, a condition "A or B" is satisfied by any one of the following: A is true (or present) and B is false (or not present), A is false (or not present) and B is true (or present), and both A and B are true (or present). Similarly, a condition "A, B, or C" is satisfied by any combination of A, B, and C being true (or present). As a not-limiting example, the condition "A, B, or C" is satisfied when A and B are true (or present) and C is false (or not present). Similarly, as another not-limiting example, the condition "A, B, or C" is satisfied when A is true (or present) and B and C are false (or not present).

What is claimed is:

1. A computer-implemented method for managing failures in a hierarchical storage system, the method comprising:

storing data across a plurality of storage devices and storage nodes arranged in a hierarchical structure, wherein each storage node comprises multiple storage devices;

detecting a failure of a first storage device on a first node;

determining whether reconstruction of data previously stored on the first storage device is to be performed at storage device level or storage node level based on a redundancy level of data associated with the first storage device, a number of failed storage devices on the first node, and a number of failed storage nodes, each failed storage node including at least one failed storage device, comprising:

in response to determining that a number of failed storage nodes does not exceed a predetermined threshold, determining that reconstruction is to be performed at the storage node level, wherein reconstruction performed at the storage node level includes reconstructing lost data using data stored on other storage nodes, and causing the reconstruction of data previously stored on the first storage device to be performed at the storage node level;

detecting a failure of a second storage device on a second node;

determining whether reconstruction of data previously stored on the second storage device is to be performed at storage device level or storage node level based on a redundancy level of data associated with the second storage device, a number of failed storage devices on the first node, and a number of failed storage nodes, comprising:

in response to determining that the number of failed storage nodes exceeds the predetermined threshold, determining that reconstruction is to be performed at the storage device level, wherein reconstruction performed at the storage device level includes reconstructing lost data using data stored on other storage devices within a same node on which failed storage device resides; and causing the reconstruction of data previously stored on the second storage device to be performed at the storage device level.

2. The method of claim 1, further comprising:

during reconstruction of data previously stored on the first storage device at the storage node level, in response to detecting a failure of an additional storage device, redetermining whether reconstruction of data previously stored on the first storage device should be performed at the storage device level or the storage node level based on an updated number of failed storage nodes; and in response to determining that the updated number of failed storage nodes exceeds the predetermined threshold, transitioning reconstruction of data previously stored on the first storage device from the storage node level to the storage device level.

3. The method of claim 1, wherein reconstruction performed at the storage node level comprises:

retrieving redundant data stored in one or more other storage nodes; and reconstructing data previously stored in the first storage device using the redundant data.

4. The method of claim 3, wherein reconstruction of data previously stored on the first storage device performed at the storage node level comprises:

identifying one or more storage devices within the first node that have sufficient spare storage capacity; and storing the reconstructed data in the one or more storage devices within the first node.

5. The method of claim 3, wherein reconstruction of data previously stored on the first storage device performed at the storage node level comprises:

in response to determining that the first node does not have sufficient spare storage capacity;

identifying one or more storage devices on a second node that have sufficient spare storage capacity; and storing the reconstructed data in the one or more storage devices within the second node.

6. The method of claim 1, wherein reconstruction of data previously stored on the second storage device performed at the storage device level comprises:

using RAID-based parity data stored on other storage devices within the second node to reconstruct lost data;

identifying one or more storage devices within the second node that have sufficient spare storage capacity; and storing the reconstructed data on the one or more storage devices within the second node.

7. The method of claim 1, wherein transitioning reconstruction from the storage node level to the storage device level comprises performing reconstruction at both the storage node level and the storage device level concurrently.

8. A non-transitory computer-readable storage medium storing instructions that when executed by one or more computer processors, cause the one or more computer processors to perform steps comprising:

storing data across a plurality of storage devices and storage nodes arranged in a hierarchical structure, wherein each storage node comprises multiple storage devices;

detecting a failure of a first storage device on a first node;

determining whether reconstruction of data previously stored on the first storage device is to be performed at storage device level or storage node level based on a redundancy level of data associated with the first storage device, a number of failed storage devices on the first node, and a number of failed storage nodes, each failed storage node including at least one failed storage device, comprising:

in response to determining that a number of failed storage nodes does not exceed a predetermined threshold, determining that reconstruction is to be performed at the storage node level, wherein reconstruction performed at the storage node level includes reconstructing lost data using data stored on other storage nodes, and causing the reconstruction of data previously stored on the first storage device to be performed at the storage node level;

detecting a failure of a second storage device on a second node;

determining whether reconstruction of data previously stored on the second storage device is to be performed at storage device level or storage node level based on a redundancy level of data associated with the second storage device, a number of failed storage devices on the first node, and a number of failed storage nodes, comprising:

in response to determining that the number of failed storage nodes exceeds the predetermined threshold, determining that reconstruction is to be performed at the storage device level, wherein reconstruction performed at the storage device level includes reconstructing lost data using data stored on other storage devices within a same node on which failed storage device resides; and causing the reconstruction of data previously stored on the second storage device to be performed at the storage device level.

9. The non-transitory computer-readable storage medium of claim 8, the steps further comprising:

during reconstruction of data previously stored on the first storage device at the storage node level, in response to detecting a failure of an additional storage device, redetermining whether reconstruction of data previously stored on the first storage device should be performed at the storage device level or the storage node level based on an updated number of failed storage nodes; and in response to determining that the updated number of failed storage nodes exceeds the predetermined threshold, transitioning reconstruction of data previously stored on the first storage device from the storage node level to the storage device level.

10. The non-transitory computer-readable storage medium of claim 8, wherein reconstruction performed at the storage node level comprises:

retrieving redundant data stored in one or more other storage nodes; and reconstructing data previously stored in the first storage device using the redundant data.

11. The non-transitory computer-readable storage medium of claim 10, wherein reconstruction of data previously stored on the first storage device performed at the storage node level comprises:

identifying one or more storage devices within the first node that have sufficient spare storage capacity; and storing the reconstructed data in the one or more storage devices within the first node.

12. The non-transitory computer-readable storage medium of claim 10, wherein reconstruction of data previously stored on the first storage device performed at the storage node level comprises:

in response to determining that the first node does not have sufficient spare storage capacity;

identifying one or more storage devices on a second node that have sufficient spare storage capacity; and storing the reconstructed data in the one or more storage devices within the second node.

13. The non-transitory computer-readable storage medium of claim 8, wherein reconstruction of data previously stored on the second storage device performed at the storage device level comprises:

using RAID-based parity data stored on other storage devices within the second node to reconstruct lost data;

identifying one or more storage devices within the second node that have sufficient spare storage capacity; and storing the reconstructed data on the one or more storage devices within the second node.

14. The non-transitory computer-readable storage medium of claim 8, wherein transitioning reconstruction from the storage node level to the storage device level comprises performing reconstruction at both the storage node level and the storage device level concurrently.

15. A computing system comprising:

one or more computer processors; and a non-transitory computer readable storage medium storing instructions that when executed by the one or more computer processors, cause the one or more computer processors to perform steps comprising computer-implemented method, comprising:

storing data across a plurality of storage devices and storage nodes arranged in a hierarchical structure, wherein each storage node comprises multiple storage devices;

detecting a failure of a first storage device on a first node;

determining whether reconstruction of data previously stored on the first storage device is to be performed at storage device level or storage node level based on a redundancy level of data associated with the first storage device, a number of failed storage devices on the first node, and a number of failed storage nodes, each failed storage node including at least one failed storage device, comprising:

in response to determining that a number of failed storage nodes does not exceed a predetermined threshold, determining that reconstruction is to be performed at the storage node level, wherein reconstruction performed at the storage node level includes reconstructing lost data using data stored on other storage nodes, and causing the reconstruction of data previously stored on the first storage device to be performed at the storage node level;

detecting a failure of a second storage device on a second node;

determining whether reconstruction of data previously stored on the second storage device is to be performed at storage device level or storage node level based on a redundancy level of data associated with the second storage device, a number of failed storage devices on the first node, and a number of failed storage nodes, comprising:

in response to determining that the number of failed storage nodes exceeds the predetermined threshold, determining that reconstruction is to be performed at the storage device level, wherein reconstruction performed at the storage device level includes reconstructing lost data using data stored on other storage devices within a same node on which failed storage device resides; and causing the reconstruction of data previously stored on the second storage device to be performed at the storage device level.

16. The computing system of claim 15, the steps further comprising:

during reconstruction of data previously stored on the first storage device at the storage node level, in response to detecting a failure of an additional storage device, redetermining whether reconstruction of data previously stored on the first storage device should be performed at the storage device level or the storage node level based on an updated number of failed storage nodes; and in response to determining that the updated number of failed storage nodes exceeds the predetermined threshold, transitioning reconstruction of data previously stored on the first storage device from the storage node level to the storage device level.

17. The computing system of claim 15, wherein reconstruction performed at the storage node level comprises:

retrieving redundant data stored in one or more other storage nodes; and reconstructing data previously stored in the first storage device using the redundant data.

18. The computing system of claim 17, wherein reconstruction of data previously stored on the first storage device performed at the storage node level comprises:

identifying one or more storage devices within the first node that have sufficient spare storage capacity; and storing the reconstructed data in the one or more storage devices within the first node.

19. The computing system of claim 17, wherein reconstruction of data previously stored on the first storage device performed at the storage node level comprises:

in response to determining that the first node does not have sufficient spare storage capacity;

identifying one or more storage devices on a second node that have sufficient spare storage capacity; and storing the reconstructed data in the one or more storage devices within the second node.

20. The computing system of claim 15, wherein reconstruction of data previously stored on the second storage device performed at the storage device level comprises:

using RAID-based parity data stored on other storage devices within the second node to reconstruct lost data;

identifying one or more storage devices within the second node that have sufficient spare storage capacity; and storing the reconstructed data on the one or more storage devices within the second node.

* * * * *